(12) United States Patent
Chen et al.

(10) Patent No.: US 11,388,701 B2
(45) Date of Patent: Jul. 12, 2022

(54) DATA TRANSMISSION METHOD, BASE STATION, AND USER EQUIPMENT

(71) Applicant: VIVO MOBILE COMMUNICATION CO., LTD., Chang'an Dongguan (CN)

(72) Inventors: Xiaohang Chen, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 291 days.

(21) Appl. No.: 16/625,304

(22) PCT Filed: Jun. 13, 2018

(86) PCT No.: PCT/CN2018/091032
§ 371 (c)(1),
(2) Date: Dec. 20, 2019

(87) PCT Pub. No.: WO2018/233521
PCT Pub. Date: Dec. 27, 2018

(65) Prior Publication Data
US 2021/0368494 A1    Nov. 25, 2021

(30) Foreign Application Priority Data

Jun. 22, 2017 (CN) .......................... 201710482714.4

(51) Int. Cl.
*H04W 72/04* (2009.01)
*H04L 1/00* (2006.01)

(52) U.S. Cl.
CPC ....... *H04W 72/0413* (2013.01); *H04L 1/0003* (2013.01); *H04L 1/0038* (2013.01); *H04W 72/0446* (2013.01); *H04W 72/0453* (2013.01)

(58) Field of Classification Search
CPC . H04W 72/0413; H04W 72/02; H04W 28/02; H04W 72/0446; H04W 72/04; H04W 28/04; H04W 28/16; H04L 1/0003
See application file for complete search history.

(56) References Cited

U.S. PATENT DOCUMENTS

2014/0192767 A1    7/2014  Au et al.
2016/0302076 A1   10/2016  Chou et al.
(Continued)

FOREIGN PATENT DOCUMENTS

CN        104838713 A       8/2015
CN        106060937 A      10/2016
(Continued)

OTHER PUBLICATIONS

First Chinese Office Action Application No. 201710482714.4; dated Nov. 29, 2019.
(Continued)

*Primary Examiner* — Brian D Nguyen
(74) *Attorney, Agent, or Firm* — von Briesen & Roper, s.c.

(57) ABSTRACT

Provided in the present disclosure are a data transmission method, a base station, and a User Equipment (UE). The data transmission method is applicable to a base station and includes: configuring a plurality of grant-free transmission resource configurations for a UE; and transmitting the plurality of grant-free transmission resource configurations to the UE, to enable the UE to select one grant-free transmission resource configuration from the plurality of grant-free transmission resource configurations to perform uplink data transmission.

20 Claims, 9 Drawing Sheets

(56) References Cited

U.S. PATENT DOCUMENTS

| | | | |
|---|---|---|---|
| 2017/0034845 A1 | 2/2017 | Liu et al. | |
| 2018/0199361 A1 | 7/2018 | Zhang et al. | |
| 2018/0199381 A1 | 7/2018 | Rong et al. | |
| 2018/0367282 A1 | 12/2018 | Li et al. | |
| 2019/0357192 A1* | 11/2019 | Gong | H04W 72/04 |
| 2020/0022125 A1* | 1/2020 | Li | H04L 5/0005 |
| 2020/0205133 A1* | 6/2020 | Takeda | H04L 5/0092 |
| 2020/0242670 A1* | 7/2020 | Thye | G06Q 30/04 |
| 2020/0267676 A1* | 8/2020 | Lee | H04W 56/0015 |
| 2020/0305150 A1* | 9/2020 | Aminaka | H04W 72/0413 |

FOREIGN PATENT DOCUMENTS

| | | |
|---|---|---|
| CN | 106507486 A | 3/2017 |
| CN | 106507497 A | 3/2017 |
| CN | 106535351 A | 3/2017 |
| CN | 106658742 A | 5/2017 |
| WO | WO 2016/161408 A1 | 10/2016 |
| WO | WO 2017/067428 A1 | 4/2017 |

OTHER PUBLICATIONS

Second Chinese Office Action Application No. 20171048271.,4; dated Mar. 20, 2020.

Third Chinese Office Action Application No. 201710482714.4; dated Jun. 11, 2020.

Chinese Search Report Application No. 201710482714,4; dated Apr. 16, 2018.

European Search Report Application No. 18826319.4; dated May 8, 2020.

International Search Report & Written Opinion related to Application No. PCT/CN2018/091032; dated Aug. 29, 2018.

CATT, "Grant-fee UL transmission procedure", 3GPP TSG RAN WG1 NR Ad-hoc #2, R1-1710094, Qingdao, P.R. China, Jun. 27, 2017-Jun. 30, 2017.

Intel Corporation. "UL grant-free transmissions: Physical layer procedures", 3GPP TSG RAN WG1 NR Ad-Hoc#2, R1-1710887, Qingdao, P.R. China Jun. 27, 2017-Jun. 30, 2017.

Vivo, "Discussion on UL multiplexing of eMBB and URLLC", 3GPP TSG RAN WG1 89 Meeting, R1-1707243, Hangzhou, China May 15, 2015-May 19, 2017.

Institute for Information Industry (III), "Issues and Control Design for UL Grant-free URLLC", 3GPP TSG-RAN WG1 NR Ad-Hoc#2, R1-1711006, Qingdao, P.R. China Jun. 27, 2017-Jun. 30, 2017.

NTT Docomo, Inc., "Overall solutions for UL grant free transmission" 3GPP TSG RAN WG1 NR Ad-Hoc#2, R1-1711111, Qingdao, P.R. China Jun. 27, 2017-Jun. 30, 2017.

Huawei, HiSilicon, "Reliability enhancement for grant-free transmission", 3GPP TSG RAN WG1 Meeting #92, R1-1801787, Athens, Greece. Feb. 26, 2018-Mar. 2, 2018.

* cited by examiner

DATA TRANSMISSION METHOD, BASE STATION, AND USER EQUIPMENT

CROSS-REFERENCE TO RELATED APPLICATION

This application is the U.S. national phase of PCT Application No. PCT/CN2018/091032 filed on Jun. 13, 2018, which claims priority to Chinese Patent Application No. 201710482714.4 filed in China on Jun. 22, 2017, which are incorporated herein by reference in their entireties.

TECHNICAL FIELD

The present disclosure relates to the field of communication technologies, in particular to a data transmission method, a base station and a User Equipment (UE).

BACKGROUND

A further 5$^{th}$ Generation (5G) mobile communication system is required to adapt to more diverse scenarios and service requirements. The main scenarios of the New Radio (NR) includes enhance Mobile Broadband (eMBB), massive Machine Type of Communication (mMTC), and Ultra Reliable Low Latency Communication (URLLC), these scenarios require high reliability, low latency, large bandwidth and wide coverage and the like of the system. For services of certain scenarios, low latency and highly reliable transmission are required. For such service requirements, the NR supports grant-free transmission mode to reduce signaling interaction procedures, and guarantee low latency requirement.

In the NR system, an UpLink (UL) grant-free transmission supports semi-static resource configuration, and reserves resources for possible UEs performing the UL grant-free transmission. The grant-free transmission mode can be used for low-latency services. To ensure low-latency service requirements, semi-statically configured grant-free resources are required to ensure a certain density in time to satisfy delay-sensitive service requirements. If more resources are reserved, the time-frequency resources that can be used by normal services will be occupied, resulting in a decrease in resource utilization.

It is discussed in the NR that grant-free transmission can be performed under shared resources. Therefore, it is considered to allocate the same resources to different UEs (UEs), so as to provide resource utilization. However, such implementation may bring a problem of transmission collision.

However, there is no effective mechanism for dealing with resource collisions.

SUMMARY

In a first aspect, the present disclosure provides a data transmission method applied to a base station, and the data transmission method includes: configuring a plurality of grant-free transmission resource configurations for a UE; and transmitting the plurality of grant-free transmission resource configurations to the UE, to enable the UE to select one grant-free transmission resource configuration from the plurality of grant-free transmission resource configurations to perform uplink data transmission.

In a second aspect, the present disclosure further provides a data transmission method applied to a UE, and the data transmission method includes: obtaining a plurality of grant-free transmission resource configurations configured by a base station for the UE; and performing uplink data transmission according to one grant-free transmission resource configuration in the plurality of grant-free transmission resource configurations.

In a third aspect, the present disclosure further provides a base station, and the base station includes: a configuration module, configured to configure a plurality of grant-free transmission resource configurations for a UE; and a transmission module, configured to transmit the plurality of grant-free transmission resource configurations to the UE, to enable the UE to select one grant-free transmission resource configuration from the plurality of grant-free transmission resource configurations to perform uplink data transmission.

In a fourth aspect, the present disclosure further provides a UE, and the UE includes: an obtaining module, configured to obtain a plurality of grant-free transmission resource configurations configured by a base station for the UE; and a transmission module, configured to perform uplink data transmission according to one grant-free transmission resource configuration in the plurality of grant-free transmission resource configurations.

In a fifth aspect, the present disclosure further provides a base station, and the base station includes: a memory, a processor, and a computer program stored in the memory and executable by the processor, wherein the processor is configured to execute the computer program to implement steps of the data transmission method of the first aspect as described above.

In a sixth aspect, the present disclosure further provides a UE, and the UE includes: a memory, a processor, and a computer program stored in the memory and executable by the processor, wherein the processor is configured to execute the computer program to implement steps of the data transmission method of the second aspect as described above.

In a seventh aspect, the present disclosure further provides a computer readable storage medium storing therein data and a program, wherein the data and the program are configured to be executed by a processor, to implement steps of the data transmission method of the first aspect or the second aspect as described above.

BRIEF DESCRIPTION OF THE DRAWINGS

Various other advantages and benefits will become apparent to a person skilled in the art by reading the detailed description of the optional embodiments below. The drawings are only for the purpose of illustrating optional embodiments and are not to be considered to limit the present disclosure. Throughout the drawings, the same reference numerals are used to refer to the same parts. In the figures.

DETAILED DESCRIPTION

In order to make the objects, technical solutions and advantages of the present disclosure more clear, the technical solutions of the present disclosure will be clearly and completely described below in combination with the drawings of the present disclosure. It is apparent that embodiments described are only a part of embodiments of the present disclosure, and are not all of embodiments thereof. Based on the embodiments of the present disclosure, all the other embodiments obtained by a person skilled in the art without any creative works are within the protection scope of the present disclosure.

The terms "comprise" and "have" and any variants thereof in the claims of description of the present disclosure are intended to cover non-exclusive inclusions, for example, a process, method, system, product, or device that includes a series of steps or units is not necessarily limited to those steps or units clearly listed, but may include other steps or units not explicitly listed or inherent to such processes, methods, products or devices.

A data transmission method, a base station and a UE provided by the present disclosure can solve the problem of the resource collision.

In the present disclosure, the base station may be a Base Transceiver Station (BTS) in the Global System of Mobile communication (GSM) or the Code Division Multiple Access (CDMA) system, or may be a Node B (NB) in the Wideband Code Division Multiple Access (WCDMA) system, or may also be an Evolutional Node B (eNB or eNodeB) in the LTE system, or a base station in a New Radio Access Technology (New RAT or NR), or a relay station or an access point, or a base station in a future 5G network, etc., which is not limited herein.

In the present disclosure, the UE may be a wireless terminal or a wired terminal, and the wireless terminal may be a device that provides voice and/or other service data connectivity to the user, a handheld device having a wireless connecting function, or another processing device connected to a wireless modem. The wireless terminal can communicate with one or more core networks via a Radio Access Network (RAN), and the wireless terminal can be a mobile terminal, such as a mobile phone (or referred to as a "cellular" phone) and a computer having a mobile terminal, e.g., a portable, pocket, handheld, computer built-in or in-vehicle mobile device, which exchanges language and/or data with the RAN. For example, it may be a device such as a Personal Communication Service (PCS) telephone, a cordless telephone, a Session Initiation Protocol (SIP) telephone, a Wireless Local Loop (WLL) station, or a Personal Digital Assistant (PDA). The wireless terminal may also be referred to as a system, a subscriber unit, a subscriber station, a mobile station, a mobile, a remote station, a remote terminal, an access terminal, a user terminal, a user agent, a user device or a user equipment, which is not limited herein.

Figure 1:
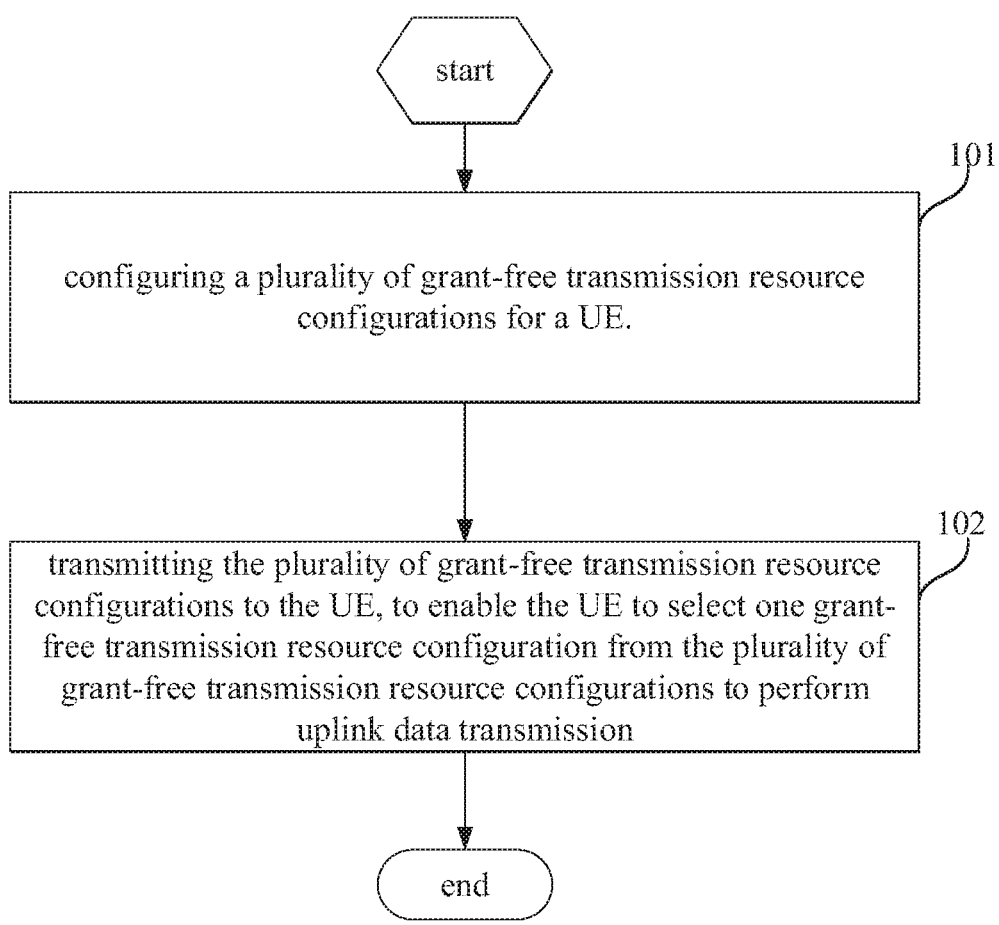
FIG. 1 is a flowchart of a data transmission method at a base station side according to the present disclosure.

Referring to FIG. 1, FIG. 1 is a flowchart of a data transmission method according to the present disclosure. The execution subject of the method is a base station, and the specific steps include steps 101-102.

Step 101: configuring a plurality of grant-free transmission resource configurations for a UE.

The above UE may also be referred to as a user equipment.

The grant-free transmission resource configuration may also be referred to as a UL grant-free transmission resource configuration. The function of the grant-free transmission resource configuration is that the UE can perform the grant-free uplink data transmission according to the grant-free transmission resource configuration.

Step 102: transmitting the plurality of grant-free transmission resource configurations to the UE, to enable the UE to select one grant-free transmission resource configuration from the plurality of grant-free transmission resource configurations to perform uplink data transmission.

Optionally, each grant-free transmission resource configuration includes one or more of the following configuration parameters: a time-frequency resource, a Reference Signal (RS) parameter, a Modulation and Coding Scheme (MCS), repetition mode, a Redundancy Version (RV), a transmission power, and a transmission interval. It should be understood that, the specific configuration parameters included in the grant-free transmission resource configuration are not limited in the embodiment of the present disclosure.

Optionally, in order to further avoid resource collision, there is one or more different configuration parameters for different grant-free transmission resource configurations in the plurality of grant-free transmission resource configurations.

For example, with respect to the different grant-free transmission resource configurations, there is only one different configuration parameter, and the other configuration parameters are the same. For example, with respect to the different grant-free transmission resource configurations, the sizes and positions of the time-frequency resources, the RS parameters, the MCSs, the repetition modes, and the RVs are the same, and only the transmission intervals are different; or configuration parameters in configuration parameter sets of different grant-free transmission resource configurations are all different, the other configuration parameters are all the same. The configuration parameter set is a subset of the grant-free transmission resource configurations. For example, with respect to the different grant-free transmission resource configurations, the sizes and positions of the time-frequency resources, the RS parameters, the MCSs, the repetition modes, and the RVs are the same, and the transmission intervals and the transmission powers are different; or all configuration parameters included in the different grant-free transmission resource configurations are different.

Optionally, in the present disclosure, when there is one or more different configuration parameters for the different grant-free transmission resource configurations, one of the one or more different configuration parameters is a time-frequency resource. The configuration or multiplexing of the time-frequency resource is as follows: the time-frequency resources in the different grant-free transmission resource configurations are mutually orthogonal, such as Frequency Division Multiplexing (FDM), Time Division Multiplexing (TDM), or Code Division Multiplexing (CDM). The time-frequency resources in the different grant-free transmission resource configurations at least partially overlap each other. For example, when sizes of the time-frequency resources in the different grant-free transmission resource configurations are different, the time-frequency resources in the different grant-free transmission resource configurations have a nested relationship, that is, a small-sized time-frequency resource is a part of a large-sized time-frequency resource.

In the present disclosure, the base station can configure a plurality of grant-free transmission resource configurations for the UE, the UE can select one of the configured plurality of grant-free transmission resource configurations according to a service performance index requirement and/or an amount of data to be transmitted, so as to perform uplink data transmission, which can improve resource utilization, be adaptable to more flexible service requirements, and reduce the probability of collisions between different UEs.

Figure 2:
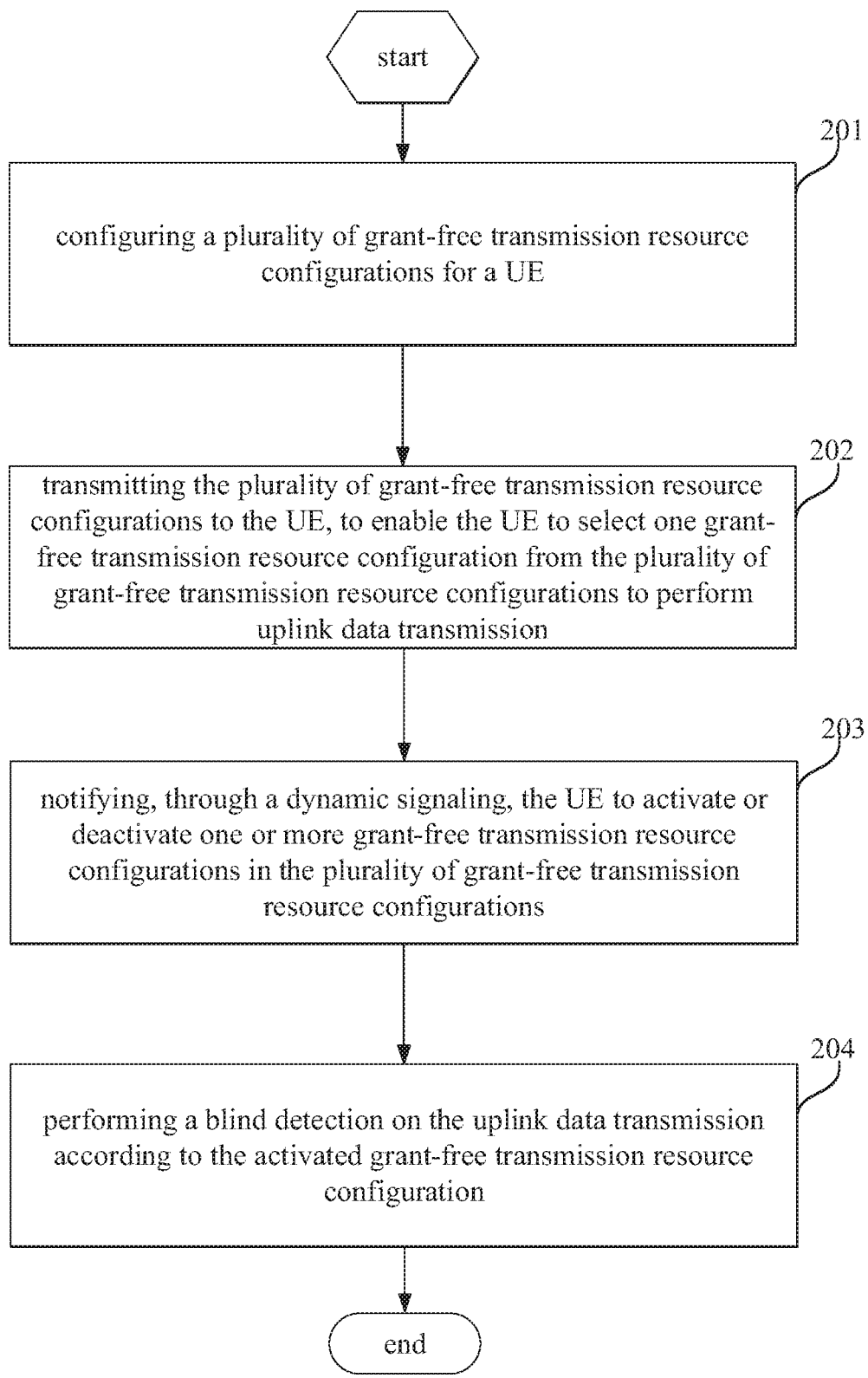
FIG. 2 is another flowchart of a data transmission method at a base station side according to the present disclosure.

Referring to FIG. 2, FIG. 2 is another flowchart of a data transmission method of the present disclosure, the execution subject of the method is a base station, and specific steps include steps 201-203.

Step 201: configuring a plurality of grant-free transmission resource configurations for a UE.

Resource utilization is improved by configuring a plurality of grant-free transmission resource configurations.

Step 202: transmitting the plurality of grant-free transmission resource configurations to the UE, to enable the UE to select one grant-free transmission resource configuration from the plurality of grant-free transmission resource configurations to perform uplink data transmission.

It should be noted that, the above step 201 is the same as step 101 in FIG. 1, and the above step 202 is the same as step 102 in FIG. 1, and details thereof are not given herein again.

Step 203: notifying, through a dynamic signaling, the UE to activate or deactivate one or more grant-free transmission resource configurations in the plurality of grant-free transmission resource configurations.

The above dynamic signaling may be L1 or L2 control signaling, but the present disclosure is not limited thereto.

Referring again to FIG. 2, the method further includes step 204.

In step 204: performing a blind detection on the uplink data transmission according to the activated grant-free transmission resource configuration.

Since the base station can perform the blind detection on the uplink data transmission according to the activated grant-free transmission resource configuration, the complexity of the blind detection performed by the base station is reduced.

In the present disclosure, the base station can configure a plurality of grant-free transmission resource configurations for the UE, the UE can select one of the plurality of configured grant-free transmission resource configurations according to a service performance index requirement and/ or an amount of data to be transmitted, and perform the uplink data transmission according to the configuration parameters in the corresponding grant-free transmission resource configurations, which can improve resource utilization, be adaptable to more flexible service requirements, and reduce the probability of collisions between different UEs.

Figure 3:
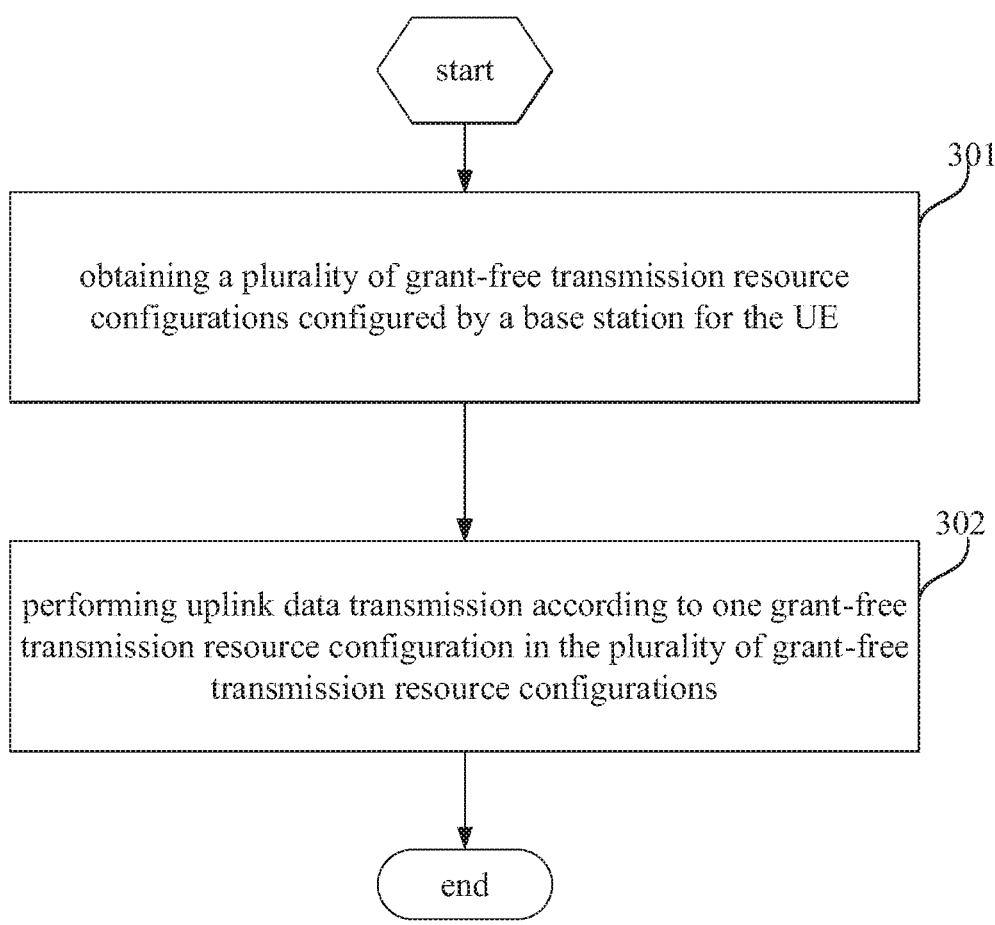
FIG. 3 is a flowchart of a data transmission method at a UE side according to the present disclosure.

Referring to FIG. 3, FIG. 3 is a flowchart of a data transmission method, the execution subject of the method is a UE, and the specific steps include steps 301-302.

Step 301: obtaining a plurality of grant-free transmission resource configurations configured by a base station for the UE.

Step 302: performing uplink data transmission according to one grant-free transmission resource configuration in the plurality of grant-free transmission resource configurations.

Optionally, each grant-free transmission resource configuration includes one or more of the following configuration parameters: a time-frequency resource, a Reference Signal (RS) parameter, a Modulation and Coding Scheme (MCS), repetition mode, a Redundancy Version (RV), a transmission power, and a transmission interval. It should be understood that, the specific configuration parameters included in the grant-free transmission resource configuration are not limited in the embodiment of the present disclosure.

Optionally, there is one or more different configuration parameters for different grant-free transmission resource configurations in the plurality of grant-free transmission resource configurations.

Optionally, with respect to the different grant-free transmission resource configurations, there is only one different configuration parameter, and the other configuration parameters are the same. For example, with respect to the different grant-free transmission resource configurations, the sizes and positions of the time-frequency resources, the RS parameters, the MCSs, the repetition modes, and the RVs are the same, and only the transmission intervals are different; or configuration parameters in configuration parameter sets of different grant-free transmission resource configurations are all different, the other configuration parameters are all the same. The configuration parameter set is a subset of the grant-free transmission resource configurations. For example, with respect to the different grant-free transmission resource configurations, the sizes and positions of the time-frequency resources, the RS parameters, the MCSs, the repetition modes, and the RVs are the same, and the transmission intervals and the transmission powers are different; or all configuration parameters included in the different grant-free transmission resource configurations are different.

Optionally, in the present disclosure, when there is one or more different configuration parameters for the different grant-free transmission resource configurations, one of the one or more different configuration parameters is a time-frequency resource. The configuration or multiplexing of the time-frequency resource is as follows: the time-frequency resources in the different grant-free transmission resource configurations are mutually orthogonal, such as Frequency Division Multiplexing (FDM), Time Division Multiplexing (TDM), or Code Division Multiplexing (CDM).

The time-frequency resources in the different grant-free transmission resource configurations at least partially overlap each other. For example, when sizes of the time-frequency resources in the different grant-free transmission resource configurations are different, the time-frequency resources in the different grant-free transmission resource configurations have a nested relationship, that is, a small-sized time-frequency resource is a part of a large-sized time-frequency resource.

In the present disclosure, the base station can configure a plurality of grant-free transmission resource configurations for the UE, the UE can select one of the plurality of configured grant-free transmission resource configurations according to a service performance index requirement and/ or an amount of data to be transmitted, so as to perform uplink data transmission according to configuration parameters in the corresponding grant-free transmission resource configuration, which can improve resource utilization, be adaptable to more flexible service requirements, and reduce the probability of collisions between different UEs.

Figure 4:
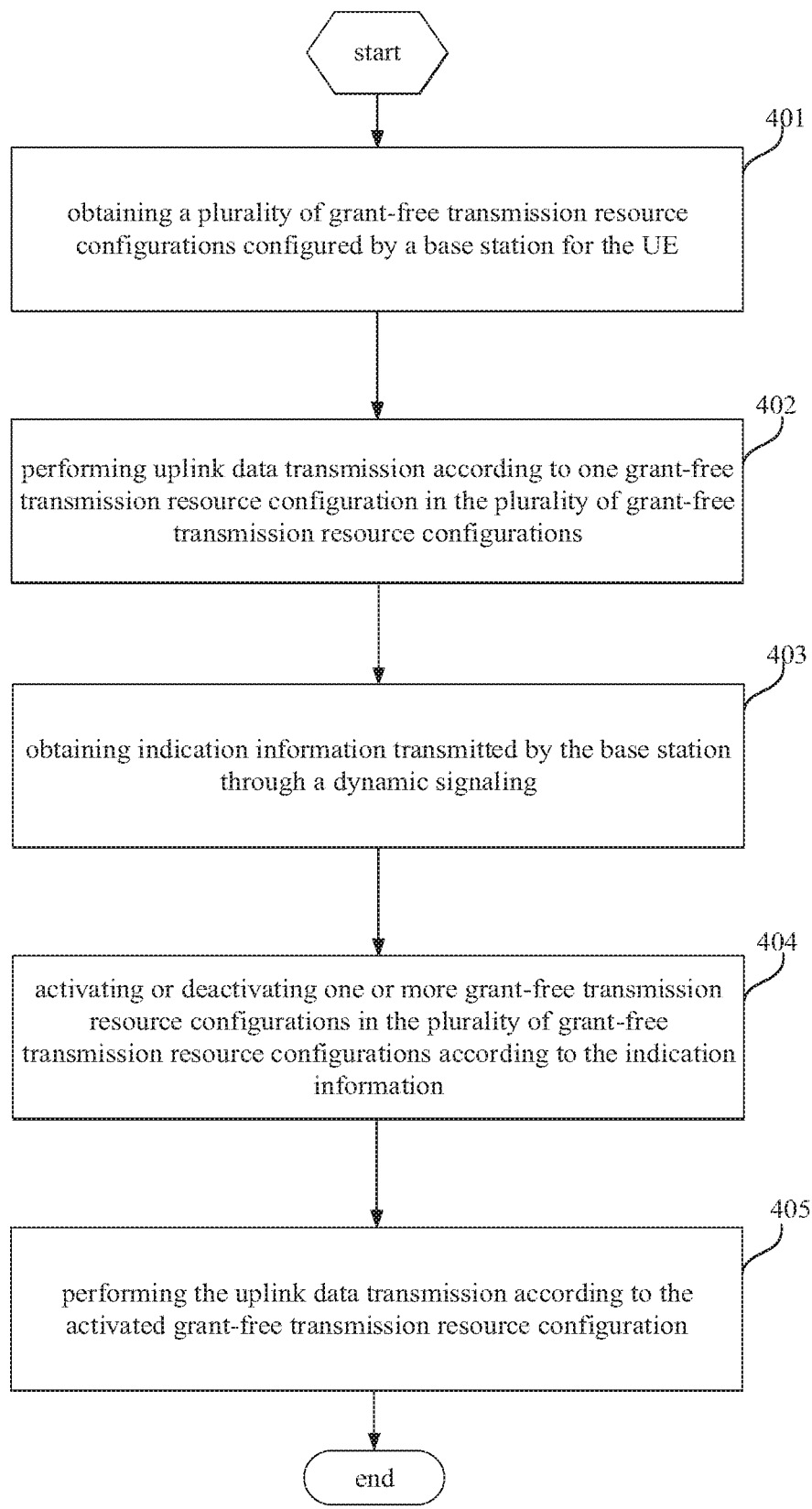
FIG. 4 is another flowchart of a data transmission method at a UE side according to the present disclosure.

Referring to FIG. 4, FIG. 4 is another flowchart of a data transmission method. The execution subject of the method is a UE, and the specific steps include steps 401405.

Step 401: obtaining a plurality of grant-free transmission resource configurations configured by a base station for the UE.

Step 402: performing uplink data transmission according to one grant-free transmission resource configuration in the plurality of grant-free transmission resource configurations.

It should be noted that, the above step 401 is the same as the step 301 in FIG. 3, and the above step 402 is the same as the step 302 in FIG. 3, details thereof are not given herein again.

Step 403: obtaining indication information transmitted by the base station through a dynamic signaling.

The above dynamic signaling may be L1 or L2 control signaling, but the present disclosure is not limited thereto.

Step 404: activating or deactivating one or more grant-free transmission resource configurations in the plurality of grant-free transmission resource configurations according to the indication information.

Step 405: performing the uplink data transmission according to the activated grant-free transmission resource configuration.

Since the base station can perform the blind detection on the uplink data transmission according to the activated grant-free transmission resource configuration, the complexity of the blind detection performed by the base station is reduced.

In the present disclosure, the base station can configure a plurality of grant-free transmission resource configurations for the UE, the UE can select one of the plurality of configured grant-free transmission resource configurations according to a service performance index requirement and/or an amount of data to be transmitted, and perform the uplink data transmission according to the configuration parameters in the corresponding grant-free transmission resource configurations, which can improve resource utilization, be adaptable to more flexible service requirements, and reduce the probability of collisions between different UEs.

Figure 5:
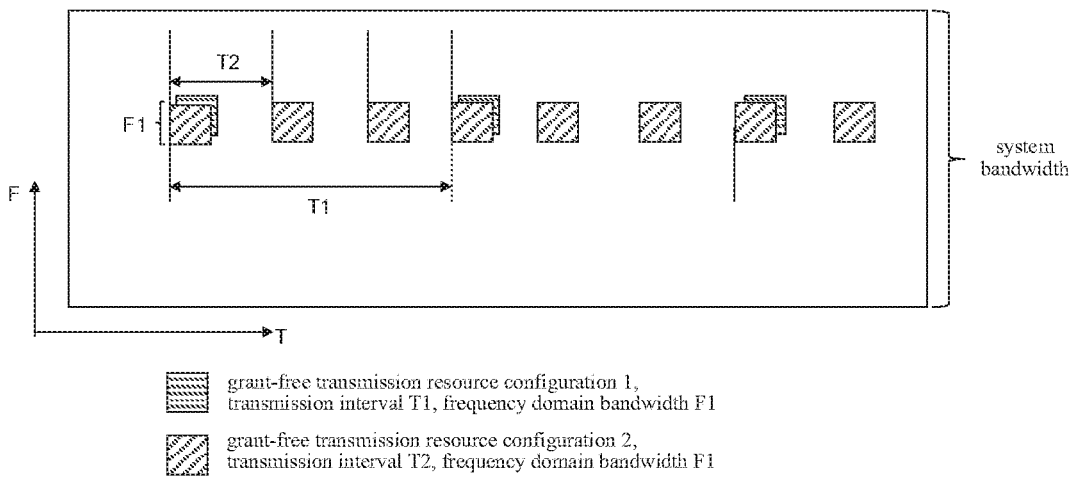
FIG. 5 to FIG. 13 are schematic diagrams of grant-free transmission resource configurations according to the present disclosure.

As shown in FIG. 5, a base station configures a plurality of grant-free transmission resource configurations for a UE, including a grant-free resource configuration 1 and a grant-free resource configuration 2, and the grant-free resource configuration 1 and the grant-free resource configuration 2 have the following relationship: the sizes and positions of the time-frequency resources are the same, the other configuration parameters (such as the RS parameters, the MCSs, the repetition modes, the RVs or the transmission powers, etc.) are all the same, and the transmission intervals are different. The transmission interval of the grant-free resource configuration 1 is T1, and the transmission interval of the grant-free resource configuration 2 is T2. The sizes of the resource block of the grant-free resource configuration 1 and the grant-free resource configuration 2 are both F1.

If the service 1 is a delay-sensitive service, the service 2 is a service that does not require a low-delay. According to the performance index of the service, the UE may select the grant-free resource configuration 2 for the data transmission of the service 1, and select the grant-free resource configuration 1 for the data transmission of the service 2.

Figure 6:
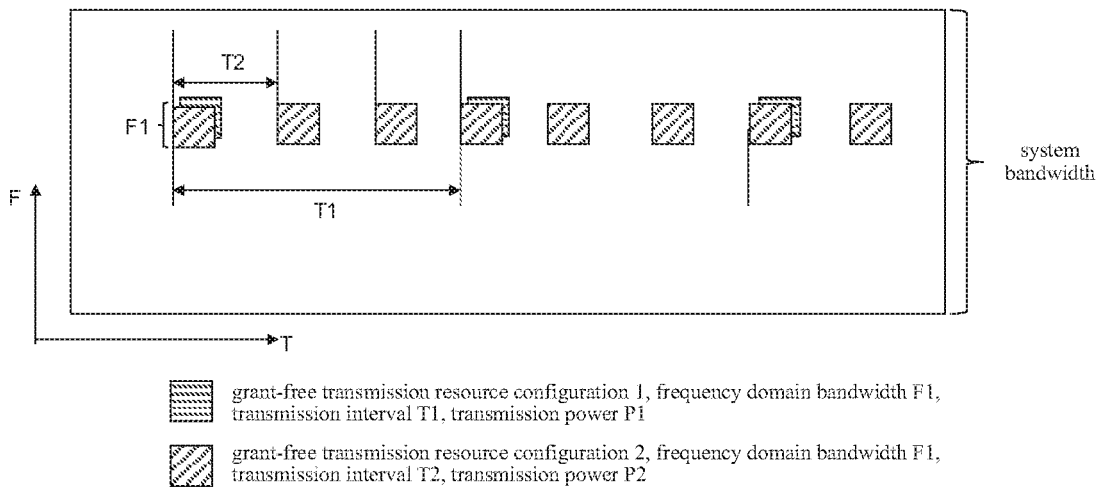

As shown in FIG. 6, a base station configures a plurality of grant-free transmission resource configurations for a UE, including a grant-free resource configuration 1 and a grant-free resource configuration 2, and the grant-free resource configuration 1 and the grant-free resource configuration 2 have the following relationship: the sizes and positions of the time-frequency resources are the same, the other configuration parameters (such as the RS parameters, the MCSs, the repetition modes, the RVs, etc.) are all the same, and the transmission intervals and the transmission powers are different. The transmission interval of the grant-free resource configuration 1 is T1, the transmission power of the grant-free resource configuration 1 is P1, the transmission interval of the grant-free resource configuration 2 is T2, and the transmission power of the grant-free resource configuration 2 is P2. The size of the resource block of the grant-free resource configuration 1 and the size of the resource block of the grant-free resource configuration 2 are both F1.

Figure 7:
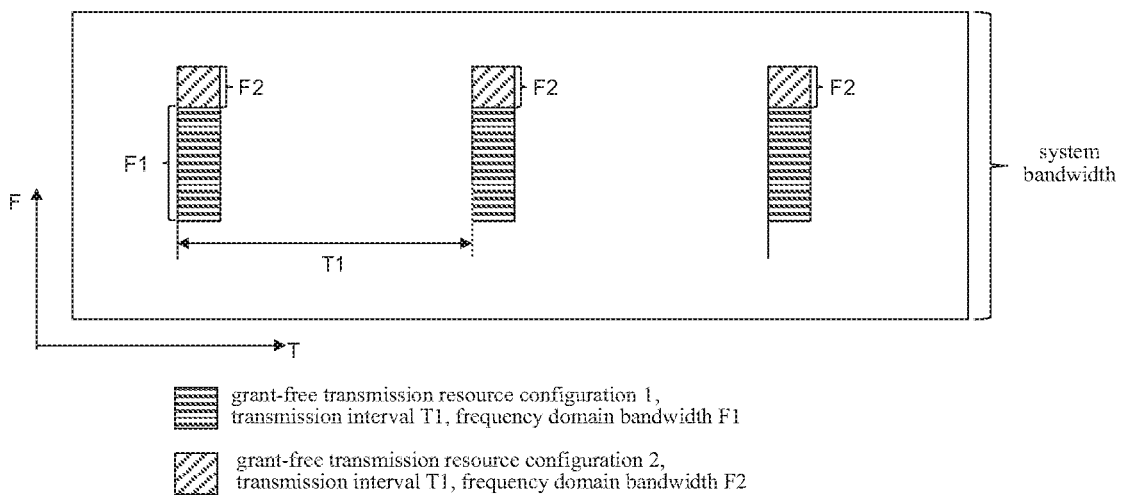

Referring to FIG. 7, a base station configures a plurality of grant-free resource configurations for a UE, including a grant-free resource configuration 1 and a grant-free resource configuration 2, and the grant-free resource configuration 1 and the grant-free resource configuration 2 have the following relationship: parts of configuration parameters (such as the RS parameters, the MCSs, the repetition modes, the RVs, the transmission power, or the transmission interval, etc.) are all the same, the sizes of the time-frequency resources are different, and the frequency domains of the time-frequency resources are mutually orthogonal. The transmission intervals of the grant-free resource configuration 1 and the grant-free resource configuration 2 are both T1. The size of the resource block of the grant-free resource configuration 1 is F1, the size of the resource block of the grant-free resource configuration 2 is F2, the F1 is greater than the F2, and the resource blocks of the grant-free resource configuration 1 and the grant-free resource configuration 2 are mutually orthogonal in the frequency domain.

The UE selects the corresponding grant-free transmission resource configuration according to the amount of the data of the service and the size of the load. For example, when the data block of the service 1 is large, and the data block of the service 2 is small, the UE can select the grant-free resource configuration 1 for the data transmission of the service 1, and select the grant-free resource configuration 2 for the data transmission of the service 2.

Figure 8:
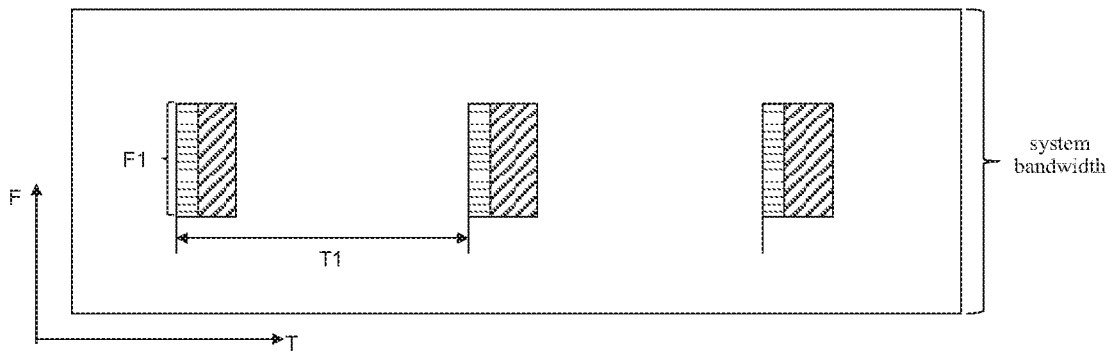

Referring to FIG. 8, a base station configures a plurality of grant-free transmission resource configurations for a UE, including a grant-free resource configuration 1 and a grant-free resource configuration 2. The grant-free resource configuration 1 and the grant-free resource configuration 2 have the following relationship: parts of the configuration parameters (such as the RS parameters, the MCSs, the repetition modes, the RVs, the transmission intervals or the transmission powers, etc.) are all the same, the sizes of the time-frequency resources are different, and the time domains of the time-frequency resources are mutually orthogonal. The transmission intervals of the grant-free resource configuration 1 and the grant-free resource configuration 2 are both T1.

Figure 9:
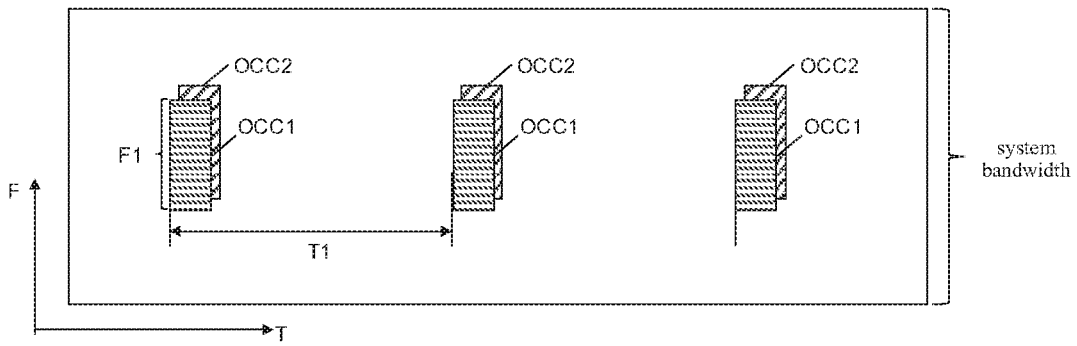

Referring to FIG. 9, a base station configures a plurality of grant-free transmission resource configurations for a UE, including a grant-free resource configuration 1 and a grant-free resource configuration 2, and the grant-free resource configuration 1 and the grant-free resource configuration 2 have the following relationship: parts of the configuration parameters (such as the RS parameters, the MCSs, the repetition modes, the RVs, the transmission intervals or the transmission powers, etc.) are all the same, the sizes of the time-frequency resource are the same, the time-frequency resources are code division multiplexed by orthogonal codes (such as a Orthogonal Cover Code (OCC) 1 for the grant-free resource configuration 1 and a OCC 2 for the grant-free resource configuration 2), and are mutually orthogonal in the code domain. The transmission intervals of the grant-free resource configuration 1 and the grant-free resource configuration 2 are both T.

Figure 10:
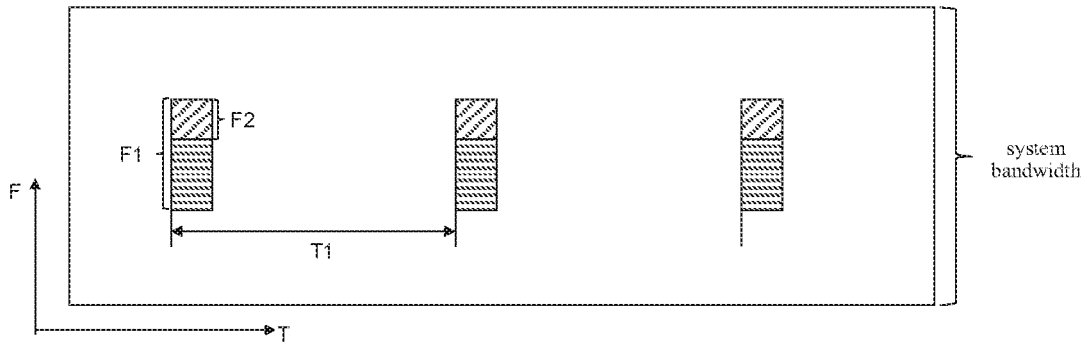

Referring to FIG. 10, a base station configures a plurality of grant-free transmission resource configurations for a UE, including a grant-free resource configuration 1 and a grant-free resource configuration 2, and the grant-free resource configuration 1 and the grant-free resource configuration 2 have the following relationship: parts of the configuration parameters (such as the RS parameters, the MCSs, the repetition modes, the RVs, the transmission intervals or the transmission powers, etc.) are all the same, the sizes of the time-frequency resources are different, the positions of the time-frequency resources are as shown in FIG. 10, wherein the size of the resource block of the grant-free resource configuration 1 is F1, and the size of the resource block of the grant-free resource configuration 2 is F2, the F1 is greater than the F2, the resource blocks of the grant-free resource configuration 1 and the grant-free resource configuration 2 partially overlap each other at the time-frequency positions. The transmission intervals of the Grant-free resource configuration 1 and the grant-free resource configuration 2 are both T1.

The UE selects the corresponding grant-free transmission resource configuration for uplink data transmission according to the amount of the data of the service and the size of the load. For example, when the data block of the service 1 is large, and the data block of the service 2 is small, the UE can select the grant-free resource configuration 1 for the data transmission of the service 1, and select the grant-free resource configuration 2 for the data transmission of the service 2. The base station can configure the grant-free transmission resource configuration with the frequency domain bandwidth F2 for different UEs at different frequency domain positions, which can reduce the collision probability of different UEs when the transmission block is small.

Figure 11:
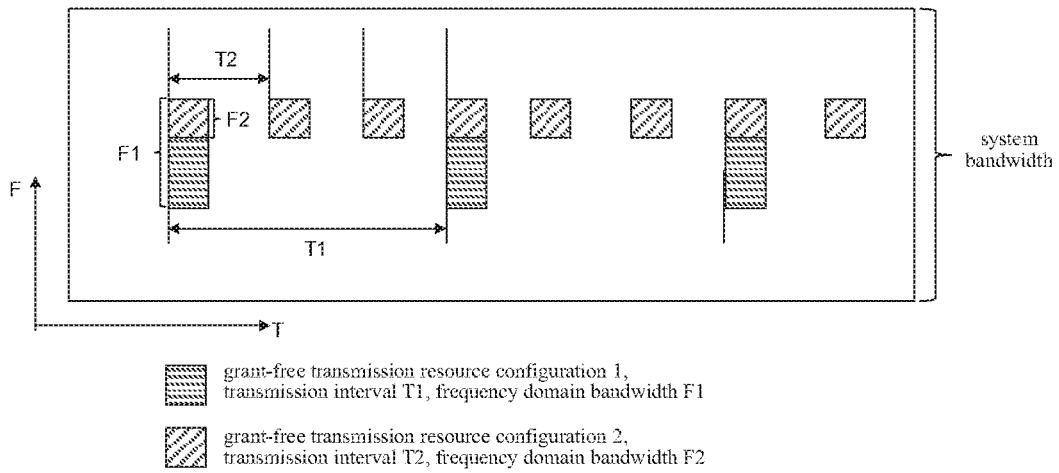

Referring to FIG. 11, a base station configures for the UE a plurality of grant-free transmission resource configurations, including a grant-free resource configuration 1 and a grant-free resource configuration 2, and the grant-free resource configuration 1 and the grant-free resource configuration 2 have the following relationship: parts of the configuration parameters (such as the RS parameters, the MCSs, the repetition modes, the RVs, or the transmission powers, etc.) are all the same, the sizes of the time-frequency resources are different, and the positions of the time-frequency resources are as shown in FIG. 11, wherein the size of the resource block of the grant-free resource configuration 1 is F1, the size of the resource block of the grant-free resource configuration 2 is F2, the F1 is greater than the F2, the resource blocks of the grant-free resource configuration 1 and the grant-free resource configuration 2 partially overlap each other at time-frequency positions; the transmission intervals of the grant-free resource configuration 1 and the grant-free resource configuration 2 are different, the transmission interval of the grant-free resource configuration 1 is T1, and the transmission interval of the grant-free resource configuration 2 is T2. A large quantity of resources are allocated for the resource configuration of grant transmission with large transmission interval, which can improve resource utilization to some extent.

Figure 12:
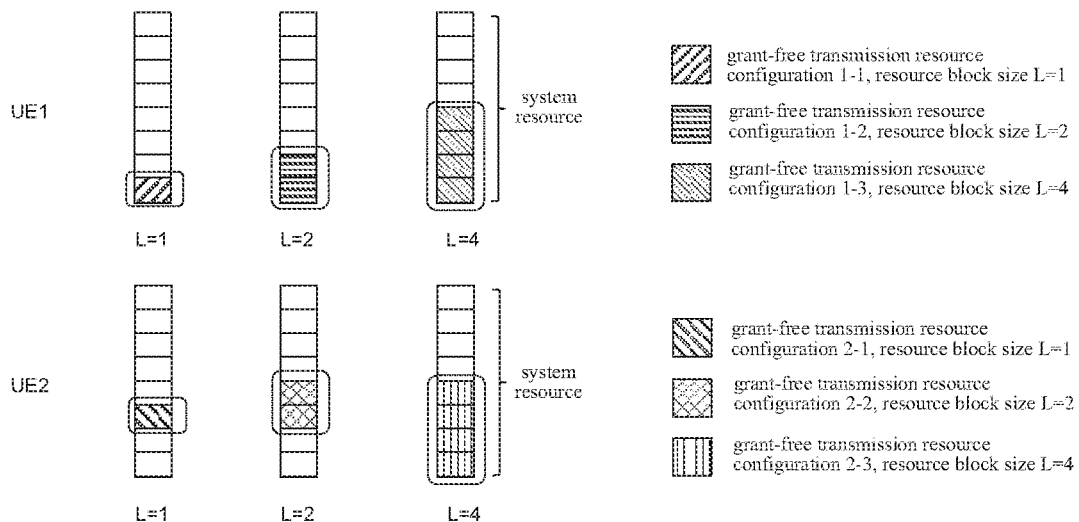

Referring to FIG. 12, when a base station configures a plurality of grant-free transmission resource configurations for a UE, different sizes of the time-frequency resources can be allocated. In order to reduce the detection complexity of the base station, for the grant-free transmission resource configuration with a size of the certain time-frequency resource, the starting position of the time-frequency resource thereof is limited, for example, it may limit that the starting position is related to the time-frequency resource number. For example, as shown in FIG. 12, three grant-free transmission resource configurations including a grant-free resource configuration 1-1, a grant-free resource configuration 1-2 and a grant-free resource configuration 1-3 are configured for a UE1, the sizes of the their resource blocks are L=1, L=2 and L=4, respectively; wherein the small resource block is a subset of the large resource blocks, for example, the resource block of the grant-free resource configuration 1-1 is a subset of the resource blocks of the grant-free resource configuration 1-2, and the resource blocks of the grant-free resource configuration 1-2 is a subset of the resource blocks of the grant-free resource configuration 1-3.

Similarity, three grant-free transmission resource configurations including a grant-free resource configuration 2-1, a grant-free resource configuration 2-2 and a grant-free resource configuration 2-3 are configured for a UE2, the sizes of the resource blocks are L=1, L=2 and L=4, respectively; wherein the small resource block is a subset of the large resource blocks, for example, the resource block of the grant-free resource configuration 2-1 is a subset of the resource blocks of the grant-free resource configuration 2-2, and the resource blocks of the grant-free resource configuration 2-2 is a subset of the resource blocks of the grant-free resource configuration 2-3.

The base station may configure different grant-free transmission resource configurations with different small time-frequency resources for different UEs. As shown in FIG. 12, the grant-free resource configuration 2-1 and the grant-free resource configuration 2-2 of the UE2 are mutually orthogonal to the grant-free resource configuration 1-1 and the grant-free resource configuration 1-2 of UE1, respectively.

Figure 13:
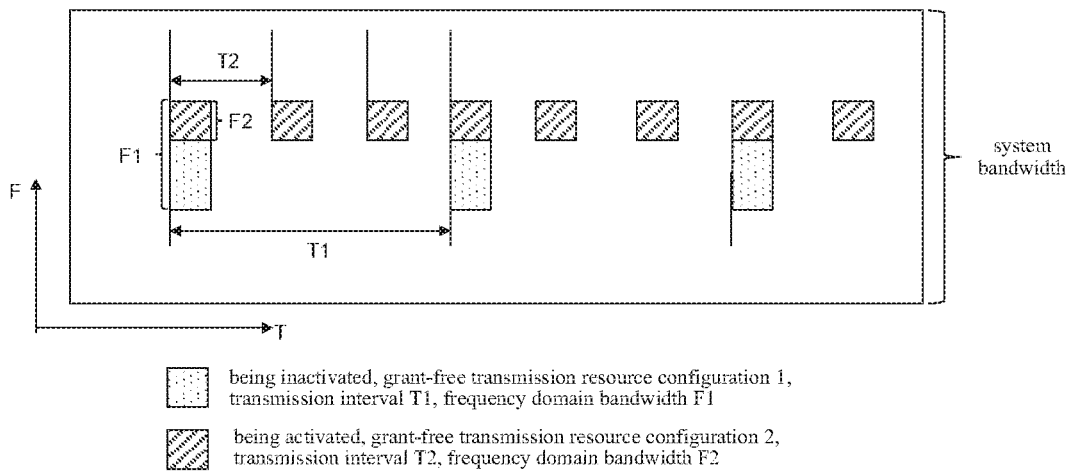

Referring to FIG. 13, the base station may activate/deactivate each grant-free transmission resource configuration (including a grant-free resource configuration 1 and a grant-free resource configuration 2) by a dynamic signaling (a L1 or L2 control signaling), the UE selects corresponding configuration parameters for uplink data transmission from one or more activated grant-free transmission resource configurations by obtaining the indication of the base station, the base station is only required to perform the blind detection on the uplink transmission according to the corresponding configuration parameters in the activated grant-free transmission resource configurations.

For example, as shown in FIG. 13, the base station deactivates the grant-free resource configuration 1 through the L1 or L2 control signaling, and maintains the grant-free resource configuration 2 in the activated state, to be adapted to the next low-latency service and reduce the complexity of the blind detection performed by the base station. The size of resource block of the grant-free resource configuration 1 is F1, the size of resource block of the grant-free resource configuration 2 is F2, the F1 is greater than the F2. The resource blocks of the grant-free resource configuration 1 and the grant-free resource configuration 2 partially overlap each other at the time-frequency positions. The transmission interval of the grant-free resource configuration 1 is T1, and the transmission interval of the grant-free resource configuration 2 is T2.

Based on the same invention conception, some embodiments of the present disclosure further provide a base station. Since the principle of solving the problem by the base station is similar to the principle of solving the problem by the data transmission method at a base station side in some embodiments of the present disclosure, the implementation of the base station can refer to the implementation of the method, and details thereof are not given herein again.

Figure 14:
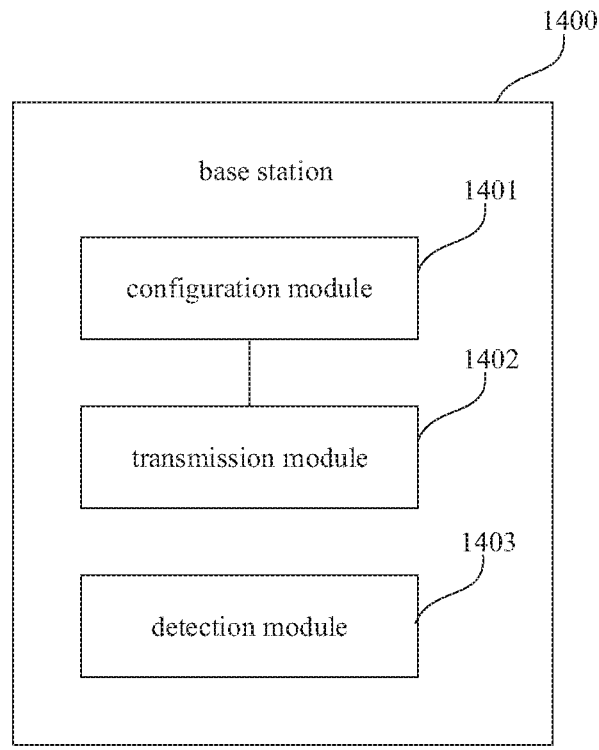
FIG. 14 is a structural schematic diagram of a base station according to the present disclosure.

Referring to FIG. 14, FIG. 14 illustrates a structural schematic diagram of a base station of the present disclosure, and the base station includes a configuration module 1401 and a transmission module 1402.

The configuration module 1401 is configured to configure a plurality of grant-free transmission resource configurations for a UE.

The transmission module 1402 is configured to transmit the plurality of grant-free transmission resource configurations to the UE, to enable the UE to select one grant-free transmission resource configuration from the plurality of grant-free transmission resource configurations to perform uplink data transmission.

Optionally, there is one or more different configuration parameters for different grant-free transmission resource configurations in the plurality of grant-free transmission resource configurations.

Optionally, each of the grant-free transmission resource configurations comprises one or more following configuration parameters: a time-frequency resource, a reference signal parameter, a modulation and coding scheme, a repetition mode, a redundancy version, a transmission power, and a transmission interval.

Optionally, there being one or more different configuration parameters for the different grant-free transmission resource configurations in the plurality of grant-free transmission resource configurations comprises: when there is the one or more different configuration parameters for the different grant-free transmission resource configurations, one of the one or more different configuration parameters is a time-frequency resource.

The time-frequency resources in the different grant-free transmission resource configurations at least partially overlap each other; or the time-frequency resources in the different grant-free transmission resource configurations are mutually orthogonal.

Optionally, the time-frequency resources in the different grant-free transmission resource configurations at least partially overlapping each other comprises: when sizes of the time-frequency resources in the different grant-free transmission resource configurations are different, the time-frequency resources in the different grant-free transmission resource configurations have a nested relationship.

Optionally, the transmission module is further configured to: notify, through a dynamic signaling, the UE to activate or deactivate one or more grant-free transmission resource configurations in the plurality of grant-free transmission resource configurations.

Referring again to FIG. 14, the base station 1400 further includes a detection module 1403. The detection module 1403 is configured to perform a blind detection on the uplink data transmission according to the activated grant-free transmission resource configuration.

The base station provided by the present disclosure can perform the method embodiment at the above base station side, the implementation principle and the technical effect thereof are similar, and details thereof are not given herein again.

Based on the same invention conception, some embodiments of the preset disclosure further provide a UE. Since the principle of solving the problem by the UE is similar to the principle of solving the problem by the data transmission method at a UE side in some embodiments of the present disclosure, the implementation of the UE can refer to the implementation of the implementation of the method, and details thereof are not given herein again.

Figure 15:
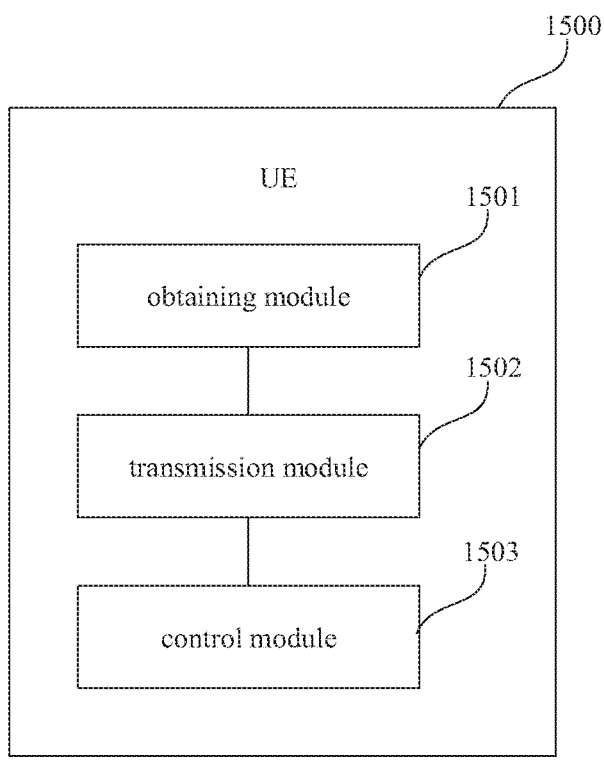
FIG. 15 is a structural schematic diagram of a UE according to the present disclosure.

Referring to FIG. 15, FIG. 15 illustrates a structural schematic diagram of a UE. The UE 1500 includes an obtaining module 1501 and a transmission module 1502.

The obtaining module 1501 is configured to obtain a plurality of grant-free transmission resource configurations configured by a base station for the UE.

Optionally, the transmission module 1502 is further configured to perform uplink data transmission according to one grant-free transmission resource configuration in the plurality of grant-free transmission resource configurations.

Optionally, the transmission module is further configured to select, according to a service performance index requirement and/or an amount of data to be transmitted, one grant-free transmission resource configuration from the plurality of grant-free transmission resource configurations, to perform the uplink data transmission.

Optionally, there is one or more different configuration parameters for different grant-free transmission resource configurations in the plurality of grant-free transmission resource configurations.

Optionally, each of the grant-free transmission resource configurations comprises one or more following configuration parameters: a time-frequency resource, a reference signal parameter, a modulation and coding scheme, a repetition mode, a redundancy version, a transmission power, and a transmission interval.

Optionally, there being one or more different configuration parameters for the different grant-free transmission resource configurations in the plurality of grant-free transmission resource configurations comprises: when there is the one or more different configuration parameters for the different grant-free transmission resource configurations, one of the one or more different configuration parameters is a time-frequency resource.

Optionally, the time-frequency resources in the different grant-free transmission resource configurations at least partially overlap each other, or the time-frequency resources in the different grant-free transmission resource configurations are mutually orthogonal.

Optionally, the time-frequency resources in the different grant-free transmission resource configurations at least partially overlapping each other comprises: when sizes of the time-frequency resources in the different grant-free transmission resource configurations are different, the time-frequency resources in the different grant-free transmission resource configurations have a nested relationship.

Optionally, the UE 1500 further includes a control module 1503. The obtaining module 1501 is further configured to obtain indication information transmitted by the base station using a dynamic signaling; the control module 1503 is configured to activate or deactivate one or more grant-free transmission resource configurations in the plurality of grant-free transmission resource configurations according to the indication information; and the transmission module 1502 is further configured to perform the uplink data transmission according to the activated grant-free transmission resource configuration.

The UE provided by the present disclosure can perform the method embodiment at the above UE side, the implementation principle and the technical effect thereof are similar, and details thereof are not given herein again.

In the following, the present disclosure further provides schematic diagrams of hardware structures of a base station and a UE.

Figure 16:
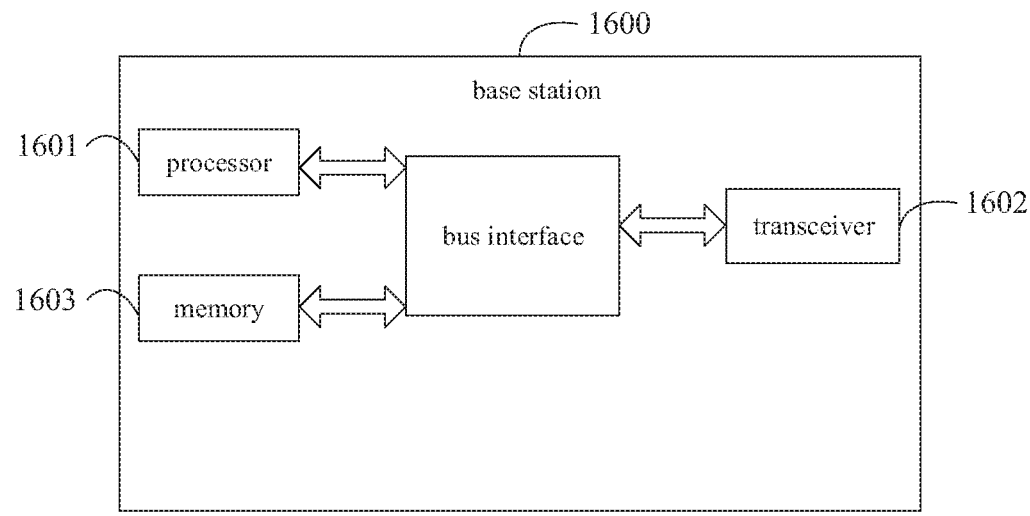
FIG. 16 is another structural schematic diagram of a base station according to the present disclosure.

Referring to FIG. 16, FIG. 16 is a structural diagram of a base station of the present disclosure, and the base station can implement the details of the data transmission method corresponding to FIG. 1 and FIG. 2 and achieve the same effect. As shown in FIG. 16, the base station 1600 includes a processor 1601, a transceiver 1602, a memory 1603, a user interface 1604, and a bus interface.

Optionally, the base station 1600 further includes a computer program stored in the memory 1603 and executable by the processor 1601, when the computer program is executed by the processor 1601, the processor 1601 implements the following steps: configuring a plurality of grant-free transmission resource configurations for a UE; and transmitting the plurality of grant-free transmission resource configurations to the UE, to enable the UE to select one grant-free transmission resource configuration from the plurality of grant-free transmission resource configurations to perform uplink data transmission.

In FIG. 16, the bus architecture may include any quantity of buses and bridges connected to each other, so as to connect various circuits for one or more processors such as the first processor 1601 and one or more memories such as the first memory 1603. In addition, the bus architecture may be used to connect various other circuits, such as a circuit for a peripheral device, a circuit for a voltage stabilizer and a power management circuit, which are known in the art and will not be further described herein. The transceiver 1602 may include a plurality of elements, i.e., a transmitter and a receiver for communication with various other devices over a transmission medium.

The processor 1601 may take charge of managing the bus architecture as well general processings. The first memory 1603 may store data therein for the operation of the processor 1601.

Optionally, when the computer program is executed by the processor 1601, the processor 1601 may further implement the following steps: notifying, through a dynamic signaling, the UE to activate or deactivate one or more grant-free transmission resource configurations in the plurality of grant-free transmission resource configurations Optionally, when the computer program is executed by the processor 1601, the processor 1601 further implements the following steps: performing a blind detection on the uplink data transmission according to the activated grant-free transmission resource configuration.

The base station in some embodiments of the present disclosure can configure a plurality of grant-free transmission resource configurations for the UE, the UE can select one of the plurality of configured grant-free transmission resource configurations according to a service performance index requirement and/or an amount of data to be transmitted, so as to perform uplink data transmission, which can improve resource utilization, be adaptable to more flexible service requirements, and reduce the probability of transmission collisions between different UEs.

Figure 17:
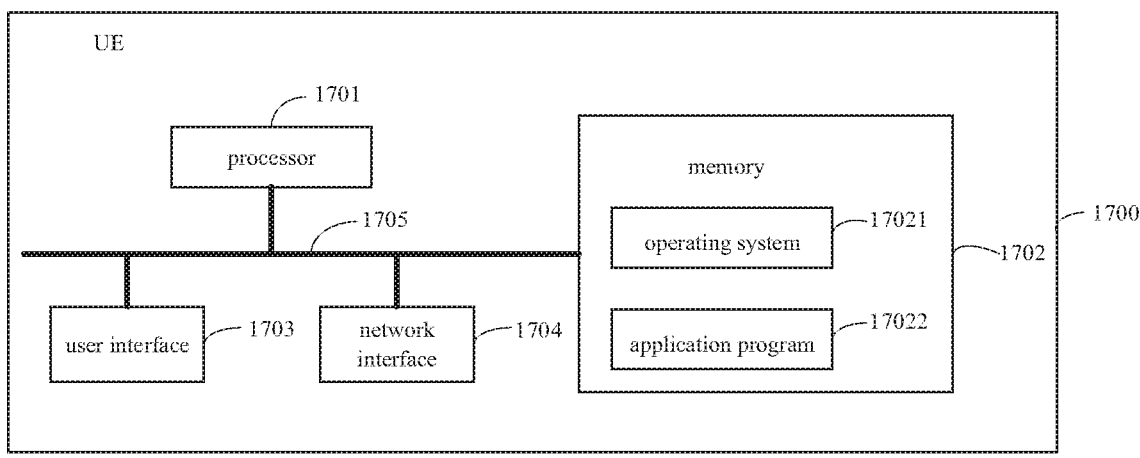
FIG. 17 is another structural schematic diagram of a UE according to the present disclosure.

FIG. 17 is another structural schematic diagram of a UE according to the present disclosure. As shown in FIG. 17, the terminal shown in FIG. 17 includes at least one processor 1701, a memory 1702, at least one network interface 1704 and a user interface 1703. The various components in terminal 1700 are coupled together by a bus system 1705. It should be appreciated that the bus system 1705 is used to implement link communication between these components. The bus system 1705 includes a power bus, a control bus, and a status signal bus in addition to the data bus. However, for clarity of description, various buses are labeled as the bus system 1705 in FIG. 17.

The user interface 1703 may include a display, a keyboard or a pointing device (e.g., a mouse, a trackball, a touch pad or a touch screen, etc.).

It is to be understood that the memory 1702 in the embodiment of the present disclosure can be either a volatile memory or a non-volatile memory, or can include both the volatile memory and the non-volatile memory. The non-volatile memory may be a Read-Only Memory (ROM), a Programmable ROM (PROM), an Erasable PROM (EPROM), or an Electrically EPROM (EEPROM) or a flash memory. The volatile memory can be a Random Access Memory (RAM) that serves as an external cache. Exemplarily but not restrictively, many forms of a RAM are available, such as a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synchlink DRAM (SLDRAM) and a Direct Rambus RAM (DRRAM).

The memory 1702 of the systems and methods described in the embodiments of the present disclosure is intended to include, but is not limited to, these and any other suitable type of memory.

In some embodiments, the memory 1702 stores the following elements: an executable module or a data structure, or a subset thereof, or an extension set thereof; an operating system 17021; and an application program 17022.

The operating system 17021 includes various system programs, such as a framework layer, a core library layer, and a driver layer, so as to implement various basic services and process a hardware-based tasks. The application program 17022 includes various application programs, such as a media player, and a browser, so as to implement various application services. A program implementing the methods of the embodiments of the present disclosure can be included in the application program 17022.

In some embodiments of the present disclosure, the processor 1701 is configured to call a program or an instruction stored in the memory 1702, e.g., the program or instruction stored in the application program 17022 to implement the method implemented by the above UE.

The above methods disclosed in the embodiments of the present disclosure may be applied to the processor 1701 or implemented by the processor 1701. The processor 1701 may be an integrated circuit chip having a signal processing capability. In the implementation process, each step of the foregoing method may be implemented by an integrated logic circuit being a hardware in the processor 1701 or an instruction in a form of software. The processor 1701 can be a general-purpose processor, a Digital Signal Processor (DSP), an Application Specific Integrated Circuit (ASIC), a Field Programmable Gate Array (FPGA), another programmable logic device, a discrete gate, a transistor logic device, or an independent hardware component, so as to implement or executes methods, steps, and logical block diagrams disclosed in some embodiments of the present disclosure. The general purpose processor may be a microprocessor, any conventional processor or the like. The steps of the method disclosed in the embodiments of the present disclosure may be implemented directly by the hardware decoding processor, or by a combination of a hardware and a software module in the hardware decoding processor. The software module can be located in a storage medium known in the art, such as a RAM, a flash memory, a ROM, a PROM, an electrically erasable programmable memory, and a register. The storage medium is located in the memory 1702, and the processor 1701 reads the information in the memory 1702 and implements the steps of the above methods in combination with its hardware.

It is to be understood that, the embodiments of the present disclosure may be implemented by hardware, software, firmware, middleware, microcode or a combination thereof. For the hardware implementation, the processing unit may be implemented in one or more of an ASIC, a DSP, a DSP device (DSPD), a Programmable Logic Device (PLD), an FPGA, a general-purpose processor, a controller, a microcontroller, a microprocessor, another electronic unit capable of achieving the functions in the present disclosure, or a combination thereof.

For software implementation, the techniques described by some embodiments of the present disclosure can be implemented by modules (e.g., procedures, functions, etc.) that perform the functions described by some embodiments of the present disclosure. The software code can be stored in the memory and executed by the processor. The memory can be implemented within the processor or external to the processor.

Specifically, the processor 1701 may call a program or an instruction stored by the memory 1702 to perform the following process: obtaining a plurality of grant-free transmission resource configurations configured by a base station for the UE; and performing uplink data transmission according to one grant-free transmission resource configuration in the plurality of grant-free transmission resource configurations.

Specifically, the processor 1701 further is configured to call a program or an instruction stored by the memory 1702 to perform the following process: selecting, according to a service performance index requirement and/or an amount of data to be transmitted, one grant-free transmission resource configuration from the plurality of grant-free transmission resource configurations, to perform the uplink data transmission.

Specifically, the processor 1701 further is configured to call a program or an instruction stored by the memory 1702 to perform the following process: obtaining indication information transmitted by the base station through a dynamic signaling; activating or deactivating one or more grant-free transmission resource configurations in the plurality of grant-free transmission resource configurations according to the indication information; and performing the uplink data transmission according to the activated grant-free transmission resource configuration.

The base station in some embodiments of the present disclosure can configure a plurality of grant-free transmission resource configurations for the UE, the UE can select one of the plurality of configured grant-free transmission resource configurations according to a service performance index requirement and/or an amount of data to be transmitted, so as to perform uplink data transmission, which can improve resource utilization, be adaptable to more flexible service requirements, and reduce the probability of transmission collisions between different UEs.

Some embodiments of the present disclosure further provides a computer readable storage medium, a data transmission program is stored on the computer readable storage medium, when the data transmission program is executed by a processor, the processor implements steps of the above data transmission method at the base station side or at the UE side. The computer readable storage medium provided by the present disclosure may be volatile or non-volatile.

A person skilled in the art may understand that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted by a person skilled in the art with respect to the specific applications so as to achieve the described functions, without departing from the scope of the present disclosure.

A person skilled in the art may further understand that, for convenience and clarification, operation procedures of the system, device and units described hereinabove may refer to the corresponding procedures in the method embodiments, and details thereof are not given herein again.

It should be further appreciated that, in the embodiments provided by the present application, the device and method may be implemented in any other ways. For example, the embodiments for the apparatus are merely for illustrative purposes, and the units are provided merely on the basis of their logic functions, and the present disclosure is not limited thereto. During the actual application, for example, some modules or units may be combined together or integrated into another system. Alternatively, some features may be omitted or not executed. In addition, the coupling connection, direct coupling connection or communication connection between the devices or units may be implemented via interfaces, and the indirect coupling connection or communication connection between the devices or units may be implemented in an electrical or mechanical form or in another form.

The units described separately may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be integrated into a unit.

In the case that the functional units are implemented in a software form and sold or used as a separate product, they may be stored in a computer-readable medium. Based on this, the technical solutions of the present disclosure, partial or substantially, or parts of the technical solutions of the present disclosure contributing to the prior art, may appear in the form of software products, which may be stored in a storage medium and include several instructions so as to enable a computer equipment (e.g., a personal computer, a server or network equipment) to execute all or parts of the steps of the method according to the embodiments of the present disclosure. The storage medium includes any medium capable of storing therein program codes, e.g., a Universal Serial Bus (USB) flash disk, a mobile Hard Disk (HD), a ROM, a RAM, a magnetic disk or an optical disk.

The above description is only the specific embodiments of the present disclosure, but the scope of the present disclosure is not limited thereto, and changes or replacements that any person skilled in the art can easily think of within the technical scope disclosed by the present disclosure are intended to be covered by the present disclosure. Therefore, the scope of protection of the present disclosure shall be subjected to the scope of protection of the claims.

What is claimed is:

1. A data transmission method, which is applied to a base station and comprises:
configuring a plurality of grant-free transmission resource configurations for a User Equipment (UE); and
transmitting the plurality of grant-free transmission resource configurations to the UE, to enable the UP to select one grant-free transmission resource configuration from the plurality of grant-free transmission resource configurations to perform uplink data transmission; and notifying, through a dynamic signaling, the UE to activate or deactivate one or more grant-free transmission resource configurations in the plurality of grant-free transmission resource configurations.

2. The method according to claim 1, wherein there is one or more different configuration parameters for different grant-free transmission resource configurations in the plurality of grant-free transmission resource configurations.

3. The method according to claim 2, wherein there being one or more different configuration parameters for the different grant-free transmission resource configurations in the plurality of grant-free transmission resource configurations comprises:

when there is the one or more different configuration parameters for the different grant-free transmission resource configurations, one of the one or more different configuration parameters is a time-frequency resource.

4. The method according to claim 3, wherein
the time-frequency resources in the different grant-free transmission resource configurations at least partially overlap each other; or
the time-frequency resources in the different grant-free transmission resource configurations are mutually orthogonal.

5. The method according to claim 4, wherein the time-frequency resources in the different grant-free transmission resource configurations at least partially overlapping each other comprises:

when sizes of the time-frequency resources in the different grant-free transmission resource configurations are different, the time-frequency resources in the different grant-free transmission resource configurations have a nested relationship.

6. The method according to claim 1, wherein each of the grant-free transmission resource configurations comprises one or more following configuration parameters: a time-frequency resource, a reference signal parameter, a modulation and coding scheme, a repetition mode, a redundancy version, a transmission power, and a transmission interval.

7. The method according to claim 1, further comprising:
performing a blind detection on the uplink data transmission according to the activated grant-free transmission resource configuration.

8. The method according to claim 1, wherein the dynamic signaling is L1 control signaling.

9. A data, transmission method, which is applied to a UE and comprises:

obtaining a plurality of gram-free transmission resource configurations configured by a base station for the UE; and performing uplink data transmission according to one grant-free transmission resource configuration in the plurality, of grant-free transmission resource configurations;

obtaining indication information transmitted by the base station through a dynamic signaling;

activating or deactivating one or more grant-free transmission resource configurations in the plurality of grant-free transmission resource configurations according to the indication information; and performing uplink data transmission according to the activated grant-free transmission resource configuration.

10. The method according to claim 9, wherein performing the uplink data transmission according to one grant-free transmission resource configuration in the plurality, of grant-free transmission resource configurations comprises:

selecting, according to a service performance index requirement and/or an amount of data to be transmitted, one grant-free transmission resource configuration from the plurality of grant-free transmission resource configurations, to perform the uplink data transmission.

11. The method according to claim 9, wherein there is one or more different configuration parameters for different grant-free transmission resource configurations in the plurality of grant-free transmission resource configurations.

12. The method according to claim 11, wherein each of the grant-free transmission resource configurations comprises one or more following configuration parameters: a time-frequency resource, a reference signal parameter, a modulation and coding scheme, a repetition mode, a redundancy version, a transmission power, and a transmission interval.

13. The method according to claim 12, wherein there being one or more different configuration parameters for the different grant-free transmission resource configurations in the plurality of grant-free transmission resource configurations comprises:

when there is the one or more different configuration parameters for the different grant-free transmission resource configurations, one of the one or more different configuration parameters is a time-frequency resource.

14. The method according to claim 13, wherein
the time-frequency resources in the different grant-free transmission resource configurations at least partially overlap each other; or
the time-frequency resources in the different grant-free transmission resource configurations are mutually orthogonal.

15. The method according to claim 14, wherein the time-frequency resources in the different grant-free transmission resource configurations at least partially overlapping each other comprises:

when sizes of the time-frequency resources in the different grant-free transmission resource configurations are different, the time-frequency resources in the different grant-free transmission resource configurations have a nested relationship.

16. A UE, comprising:
a memory; a processor, and a computer program being stored in the memory and executable by the processor, wherein the processor is configured to execute the computer program to implement steps of the data transmission method according to claim 9.

17. The method according to claim 9, wherein the dynamic signaling is L1 control signaling.

18. A base station, comprising:
a memory, a processor, and a computer program being stored in the memory, and executable by the processor, wherein the processor is configured to execute the computer program to:

configure a plurality, of grant-free transmission resource configurations for a UE; and transmit the plurality of grant-free transmission resource configurations to the UE, to enable the UE to select one grant-free transmission resource configuration from the plurality of grant-free transmission resource configurations to perform uplink data transmission; and notify, through a dynamic signaling, the UE to activate or deactivate one or more grant-free transmission resource configurations in the plurality or grant-free transmission resource configurations.

19. The base station according to claim 18, wherein there is one or more different configuration parameters for different grant-free transmission resource configurations in the plurality of grant-free transmission resource configurations.

20. The base station according to claim 18, wherein each of the grant-free transmission resource configurations comprises one or more following configuration parameters: a time-frequency resource, a reference signal parameter, a modulation and coding scheme, a repetition mode, a redundancy version, a transmission power, and a transmission interval.

* * * * *